US012502045B2

(12) United States Patent
Conrad

(10) Patent No.: US 12,502,045 B2
(45) Date of Patent: Dec. 23, 2025

(54) SURFACE CLEANING APPARATUS

(71) Applicant: Omachron Intellectual Property Inc., Hampton (CA)

(72) Inventor: Wayne Ernest Conrad, Hampton (CA)

( * ) Notice: Subject to any disclaimer, the term of this patent is extended or adjusted under 35 U.S.C. 154(b) by 124 days.

(21) Appl. No.: 17/900,088

(22) Filed: Aug. 31, 2022

(65) Prior Publication Data

US 2024/0065502 A1 Feb. 29, 2024

(51) Int. Cl.
*A47L 9/16* (2006.01)
*A47L 5/24* (2006.01)
*B04C 3/06* (2006.01)
*B04C 9/00* (2006.01)

(52) U.S. Cl.
CPC ................. *A47L 9/165* (2013.01); *A47L 5/24* (2013.01); *A47L 9/1608* (2013.01); *A47L 9/1666* (2013.01); *B04C 3/06* (2013.01); *B04C 9/00* (2013.01); *B04C 2009/004* (2013.01)

(58) Field of Classification Search
CPC .................................... B04C 3/06; B04C 9/00
USPC ........................................................... 15/347
See application file for complete search history.

(56) References Cited

U.S. PATENT DOCUMENTS

| | | |
|---|---|---|
| 5,267,371 A | 12/1993 | Soler et al. |
| 5,358,290 A | 10/1994 | Fleet et al. |
| 5,974,625 A | 11/1999 | Garner |
| 6,098,244 A | 8/2000 | Conrad et al. |
| 6,099,661 A | 8/2000 | Conrad |
| 6,101,672 A | 8/2000 | Conrad et al. |
| 6,123,779 A | 9/2000 | Conrad et al. |
| 6,129,775 A | 10/2000 | Conrad et al. |
| 6,135,708 A | 10/2000 | Conrad et al. |
| 6,168,716 B1 | 1/2001 | Conrad et al. |
| 6,170,119 B1 | 1/2001 | Conrad et al. |
| 6,173,474 B1 | 1/2001 | Conrad |
| 6,174,127 B1 | 1/2001 | Conrad et al. |
| 6,183,641 B1 | 2/2001 | Conrad et al. |
| 6,224,325 B1 | 5/2001 | Conrad et al. |
| 6,231,645 B1 | 5/2001 | Conrad et al. |
| 6,238,177 B1 | 5/2001 | Conrad et al. |
| 6,243,917 B1 | 6/2001 | Conrad |
| 6,251,296 B1 | 6/2001 | Conrad et al. |

(Continued)

FOREIGN PATENT DOCUMENTS

| | | |
|---|---|---|
| CA | 2275675 A1 | 12/1999 |
| CA | 2288544 A1 | 5/2000 |

(Continued)

OTHER PUBLICATIONS

English machine translation of JP2003112082, published on Apr. 15, 2003.

(Continued)

*Primary Examiner* — Tom Rodgers
(74) *Attorney, Agent, or Firm* — Philip C. Mendes da Costa; SMART & BIGGAR LP

(57) ABSTRACT

A surface cleaning apparatus comprises a cyclone chamber. The cyclone chamber air inlet has a downstream end that is located in the cyclone chamber. The downstream end comprises an inlet air flow path comprising an inlet sidewall, an inlet end wall and an outlet port provided in the inlet sidewall, wherein at least a portion of each of the inlet sidewall and the inlet end wall have inner surfaces that are curved.

19 Claims, 9 Drawing Sheets

(56) References Cited

U.S. PATENT DOCUMENTS

| | | | | |
|---|---|---|---|---|
| 6,261,052 | B1 | 7/2001 | Conrad et al. | |
| 6,261,379 | B1 | 7/2001 | Conrad et al. | |
| 6,280,143 | B1 | 8/2001 | Parker et al. | |
| 6,307,358 | B1 | 10/2001 | Conrad | |
| 6,312,594 | B1 | 11/2001 | Conrad et al. | |
| 6,328,527 | B1 | 12/2001 | Conrad et al. | |
| 6,334,234 | B1 | 1/2002 | Conrad et al. | |
| 6,344,064 | B1 | 2/2002 | Conrad | |
| 6,440,197 | B1 | 8/2002 | Conrad et al. | |
| 6,457,205 | B1 | 10/2002 | Conrad | |
| 6,533,834 | B2 | 3/2003 | Conrad et al. | |
| 6,599,340 | B2 | 7/2003 | Conrad et al. | |
| 6,782,585 | B1 | 8/2004 | Conrad et al. | |
| 7,065,826 | B1 | 6/2006 | Arnold | |
| 7,329,294 | B2 | 2/2008 | Conrad | |
| 7,470,299 | B2 | 12/2008 | Han et al. | |
| 7,534,279 | B2 | 5/2009 | Oh et al. | |
| 7,628,833 | B2 | 12/2009 | Oh | |
| 7,655,058 | B2 | 2/2010 | Smith | |
| 7,662,201 | B2 | 2/2010 | Lee | |
| 7,686,861 | B2 * | 3/2010 | Oh | A47L 9/1608 15/352 |
| 7,740,675 | B2 | 6/2010 | Conrad | |
| 7,749,293 | B2 | 7/2010 | Conrad | |
| 7,771,499 | B2 | 8/2010 | Oh et al. | |
| 7,776,120 | B2 | 8/2010 | Conrad | |
| 7,803,207 | B2 | 9/2010 | Conrad | |
| 7,811,345 | B2 | 10/2010 | Conrad | |
| 7,867,308 | B2 | 1/2011 | Conrad | |
| 7,941,895 | B2 | 5/2011 | Conrad | |
| 8,048,180 | B2 | 11/2011 | Oh et al. | |
| 8,127,398 | B2 | 3/2012 | Conrad | |
| 8,146,201 | B2 | 4/2012 | Conrad | |
| 8,151,407 | B2 | 4/2012 | Conrad | |
| 8,176,596 | B2 | 5/2012 | Conrad | |
| 8,186,006 | B2 | 5/2012 | Hyun et al. | |
| 8,192,515 | B2 | 6/2012 | Conrad | |
| 8,292,979 | B2 | 10/2012 | Conrad | |
| 8,296,900 | B2 | 10/2012 | Conrad | |
| 8,349,428 | B2 | 1/2013 | Conrad | |
| 8,370,993 | B2 | 2/2013 | Conrad | |
| 8,375,508 | B2 | 2/2013 | Conrad | |
| 8,448,291 | B2 | 5/2013 | Conrad | |
| 8,479,358 | B2 | 7/2013 | Conrad | |
| 8,486,170 | B2 | 7/2013 | Conrad et al. | |
| 8,510,907 | B2 | 8/2013 | Conrad | |
| 8,533,904 | B2 | 9/2013 | Conrad | |
| 8,561,257 | B2 | 10/2013 | Conrad | |
| 8,567,005 | B2 | 10/2013 | Conrad | |
| 8,578,550 | B2 | 11/2013 | Conrad | |
| 8,578,553 | B2 | 11/2013 | Conrad | |
| 8,590,102 | B2 | 11/2013 | Conrad | |
| 8,607,407 | B2 | 12/2013 | Conrad | |
| 8,621,709 | B2 | 1/2014 | Conrad | |
| 8,640,304 | B2 | 2/2014 | Conrad | |
| 8,646,147 | B2 | 2/2014 | Conrad | |
| 8,659,184 | B2 | 2/2014 | Conrad | |
| 8,677,554 | B2 | 3/2014 | Conrad | |
| 8,677,558 | B2 | 3/2014 | Conrad | |
| 8,713,751 | B2 | 5/2014 | Conrad | |
| 8,813,305 | B2 | 8/2014 | Conrad | |
| 8,834,209 | B2 | 9/2014 | Conrad | |
| 8,869,344 | B2 | 10/2014 | Conrad | |
| 8,869,345 | B2 | 10/2014 | Conrad | |
| 8,869,348 | B2 | 10/2014 | Conrad | |
| 8,875,340 | B2 | 11/2014 | Conrad | |
| 8,875,342 | B2 | 11/2014 | Conrad | |
| 9,027,198 | B2 | 5/2015 | Conrad | |
| 9,027,203 | B2 | 5/2015 | Conrad et al. | |
| 9,066,642 | B2 | 6/2015 | Conrad | |
| 9,119,513 | B2 | 9/2015 | Conrad | |
| 9,161,666 | B2 | 10/2015 | Conrad | |
| 9,161,669 | B2 | 10/2015 | Conrad | |
| 9,167,944 | B2 | 10/2015 | Conrad | |
| 9,204,769 | B2 | 12/2015 | Conrad | |
| 9,204,773 | B2 | 12/2015 | Conrad | |
| 9,215,960 | B2 | 12/2015 | Conrad | |
| 9,226,633 | B2 | 1/2016 | Conrad et al. | |
| 9,227,151 | B2 | 1/2016 | Conrad | |
| 9,227,201 | B2 | 1/2016 | Conrad | |
| 9,232,881 | B2 | 1/2016 | Conrad | |
| 9,238,235 | B2 | 1/2016 | Conrad | |
| 9,295,995 | B2 | 3/2016 | Conrad | |
| 9,314,138 | B2 | 4/2016 | Conrad | |
| 9,314,139 | B2 | 4/2016 | Conrad et al. | |
| 9,320,401 | B2 | 4/2016 | Conrad | |
| 9,326,652 | B2 | 5/2016 | Conrad | |
| 9,364,127 | B2 | 6/2016 | Conrad | |
| 9,427,122 | B2 | 8/2016 | Conrad et al. | |
| 9,427,126 | B2 | 8/2016 | Conrad | |
| 9,433,332 | B2 | 9/2016 | Conrad | |
| 9,451,852 | B2 | 9/2016 | Conrad | |
| 9,451,855 | B2 | 9/2016 | Conrad | |
| 9,456,721 | B2 | 10/2016 | Conrad | |
| 9,492,045 | B2 | 11/2016 | Conrad | |
| 9,526,394 | B2 | 12/2016 | Conrad | |
| 9,572,463 | B2 | 2/2017 | Conrad | |
| 9,591,952 | B2 | 3/2017 | Conrad | |
| 9,591,958 | B2 | 3/2017 | Conrad | |
| 9,775,484 | B2 | 10/2017 | Conrad | |
| 9,801,513 | B2 | 10/2017 | Conrad et al. | |
| 9,820,621 | B2 | 11/2017 | Conrad et al. | |
| 10,076,183 | B2 | 9/2018 | Conrad et al. | |
| 10,149,587 | B2 | 12/2018 | Conrad et al. | |
| 10,159,393 | B2 | 12/2018 | Conrad | |
| 10,201,260 | B2 | 2/2019 | Conrad et al. | |
| 10,214,349 | B2 | 2/2019 | Conrad | |
| 10,251,519 | B2 | 4/2019 | Conrad | |
| 10,357,136 | B2 | 7/2019 | Conrad | |
| 10,478,034 | B2 * | 11/2019 | Han | A47L 5/362 |
| 10,537,216 | B2 | 1/2020 | Conrad | |
| 10,537,219 | B2 | 1/2020 | Conrad et al. | |
| 10,568,477 | B2 | 2/2020 | Conrad | |
| 10,575,693 | B2 | 3/2020 | Conrad | |
| 10,667,663 | B2 | 6/2020 | Conrad | |
| 10,687,679 | B2 | 6/2020 | Conrad et al. | |
| 10,729,294 | B2 | 8/2020 | Conrad et al. | |
| 10,791,890 | B2 | 10/2020 | Conrad | |
| 10,791,896 | B2 | 10/2020 | Conrad | |
| 10,888,205 | B2 | 1/2021 | Conrad et al. | |
| 10,932,634 | B2 | 3/2021 | Conrad | |
| 10,959,588 | B2 | 3/2021 | Conrad et al. | |
| 11,013,378 | B2 | 5/2021 | Conrad | |
| 11,108,254 | B2 | 8/2021 | Conrad | |
| 11,135,602 | B2 | 10/2021 | Conrad | |
| 11,154,169 | B2 | 10/2021 | Conrad | |
| 11,198,085 | B2 | 12/2021 | Conrad et al. | |
| 11,213,179 | B2 | 1/2022 | Conrad | |
| 11,246,462 | B2 | 2/2022 | Conrad | |
| 11,285,495 | B2 | 3/2022 | Conrad | |
| 11,318,482 | B2 | 5/2022 | Conrad | |
| 11,478,116 | B2 | 10/2022 | Conrad | |
| 11,478,117 | B2 | 10/2022 | Conrad et al. | |
| 11,529,034 | B2 | 12/2022 | Conrad | |
| 11,534,041 | B2 | 12/2022 | Conrad | |
| 11,534,043 | B2 | 12/2022 | Conrad | |
| 11,534,702 | B2 | 12/2022 | Conrad | |
| 11,547,258 | B2 | 1/2023 | Conrad | |
| 11,571,097 | B2 | 2/2023 | Conrad | |
| 11,612,290 | B2 | 3/2023 | Conrad | |
| 11,641,995 | B2 | 5/2023 | Conrad | |
| 11,707,170 | B2 | 7/2023 | Conrad | |
| 11,737,625 | B2 | 8/2023 | Conrad | |
| 11,745,131 | B2 | 9/2023 | Conrad | |
| 11,793,374 | B2 | 10/2023 | Conrad | |
| 11,839,343 | B2 | 12/2023 | Conrad et al. | |
| 11,841,024 | B2 | 12/2023 | Conrad | |
| 11,857,142 | B2 | 1/2024 | Conrad | |
| 11,950,745 | B2 | 4/2024 | Conrad et al. | |
| 12,053,143 | B2 | 8/2024 | Conrad | |
| 12,075,966 | B2 | 9/2024 | Conrad | |
| 2001/0027587 | A1 | 10/2001 | Conrad et al. | |
| 2002/0162188 | A1 | 11/2002 | Harmen | |
| 2003/0201754 | A1 | 10/2003 | Conrad | |

(56) References Cited

U.S. PATENT DOCUMENTS

| | | | |
|---|---|---|---|
| 2004/0216266 A1 | 11/2004 | Conrad | |
| 2005/0229554 A1 | 10/2005 | Oh et al. | |
| 2006/0196004 A1 | 9/2006 | Conrad | |
| 2008/0104795 A1 | 5/2008 | Lang | |
| 2008/0172992 A1 | 7/2008 | Conrad | |
| 2008/0178416 A1 | 7/2008 | Conrad | |
| 2008/0178418 A1 | 7/2008 | Conrad | |
| 2008/0179133 A1 | 7/2008 | Conrad | |
| 2008/0196366 A1 | 8/2008 | Conrad | |
| 2008/0216281 A1 | 9/2008 | Conrad | |
| 2009/0241491 A1 | 10/2009 | Han et al. | |
| 2009/0293224 A1 | 12/2009 | Hyun et al. | |
| 2010/0175217 A1 | 7/2010 | Conrad | |
| 2010/0229323 A1 | 9/2010 | Conrad | |
| 2010/0229325 A1 | 9/2010 | Conrad | |
| 2010/0229326 A1 | 9/2010 | Conrad | |
| 2010/0229334 A1 | 9/2010 | Conrad | |
| 2010/0229335 A1 | 9/2010 | Conrad | |
| 2010/0251507 A1 | 10/2010 | Conrad | |
| 2011/0219567 A1 | 9/2011 | Conrad | |
| 2011/0219579 A1 | 9/2011 | Conrad | |
| 2014/0237768 A1 | 8/2014 | Conrad | |
| 2016/0174789 A1* | 6/2016 | Han | A47L 9/1683 15/327.1 |
| 2017/0303754 A1 | 10/2017 | Conrad et al. | |
| 2017/0303755 A1 | 10/2017 | Conrad et al. | |
| 2018/0177363 A1 | 6/2018 | Ni | |
| 2018/0353032 A1 | 12/2018 | Conrad | |
| 2019/0090701 A1 | 3/2019 | Tonderys et al. | |
| 2019/0254491 A1 | 8/2019 | Conrad | |
| 2020/0187738 A1 | 6/2020 | Conrad et al. | |
| 2020/0305671 A1 | 10/2020 | Conrad | |
| 2021/0052122 A1* | 2/2021 | Leffler | A47L 9/1683 |
| 2021/0228032 A1 | 7/2021 | Conrad | |
| 2021/0330157 A1 | 10/2021 | Conrad | |
| 2021/0361131 A1* | 11/2021 | Conrad | A47L 5/225 |
| 2021/0386258 A1 | 12/2021 | Conrad | |
| 2022/0142440 A1 | 5/2022 | Conrad | |
| 2022/0151446 A1 | 5/2022 | Conrad et al. | |
| 2023/0098664 A1 | 3/2023 | Conrad | |
| 2023/0263350 A1 | 8/2023 | Conrad et al. | |
| 2023/0348169 A1 | 11/2023 | Conrad | |
| 2024/0008701 A1 | 1/2024 | Conrad et al. | |
| 2024/0016351 A1 | 1/2024 | Conrad | |
| 2024/0041284 A1 | 2/2024 | Conrad | |
| 2024/0138634 A1 | 5/2024 | Conrad | |
| 2024/0172909 A1 | 5/2024 | Conrad | |
| 2024/0180373 A1 | 6/2024 | Conrad et al. | |
| 2024/0180379 A1 | 6/2024 | Conrad | |
| 2024/0245271 A1 | 7/2024 | Conrad | |
| 2024/0358212 A1 | 10/2024 | Conrad | |

FOREIGN PATENT DOCUMENTS

| | | | |
|---|---|---|---|
| CA | 2258416 | A1 | 7/2000 |
| CA | 2258419 | A1 | 7/2000 |
| CA | 2258421 | A1 | 7/2000 |
| CA | 2258422 | A1 | 7/2000 |
| CA | 2258423 | A1 | 7/2000 |
| CA | 2258426 | A1 | 7/2000 |
| CA | 2330801 | A1 | 7/2001 |
| CA | 2338193 | A1 | 7/2002 |
| CA | 2339514 | A1 | 9/2002 |
| CA | 2342673 | A1 | 9/2002 |
| CA | 2342993 | A1 | 9/2002 |
| CA | 2658014 | A1 | 9/2010 |
| CA | 2658022 | A1 | 9/2010 |
| CA | 2658160 | A1 | 9/2010 |
| CA | 2658366 | A1 | 9/2010 |
| CA | 2658397 | A1 | 9/2010 |
| CA | 2658497 | A1 | 9/2010 |
| CA | 2658643 | A1 | 9/2010 |
| CA | 2658644 | A1 | 9/2010 |
| CN | 102429611 | A | 5/2012 |
| CN | 106725109 | A | 5/2017 |
| EP | 2866630 | A1 | 5/2015 |
| JP | 08-322769 | A | 10/1996 |
| JP | 2003112082 | A | 4/2003 |
| KR | 100816911 | B1 | 3/2008 |
| KR | 100880494 | B1 | 1/2009 |
| KR | 10-1692736 | B1 | 1/2017 |
| WO | 9835603 | A1 | 8/1998 |
| WO | 0010718 | A1 | 3/2000 |
| WO | 2008114966 | A1 | 9/2008 |
| WO | 2009011494 | A1 | 1/2009 |
| WO | 2017171500 | A1 | 10/2017 |

OTHER PUBLICATIONS

English machine translation of KR101692736B1, published on Jan. 4, 2017.

English machine translation of CN106725109A, published on May 31, 2017.

English machine translation of CN102429611A, published on May 12, 2012.

English machine translation of KR100880494B1, published on Jan. 19, 2009.

English machine translation of KR100816911B1, published on Mar. 19, 2008.

English machine translation of JP08-322769, published on Dec. 10, 2016, obtained through JP Patent Office search engine.

English machine translation of EP2866630, published on Aug. 31, 2016.

U.S. Appl. No. 09/343,479, filed Jun. 30, 1999.

* cited by examiner

SURFACE CLEANING APPARATUS

FIELD

This disclosure relates generally to surface cleaning apparatuses.

INTRODUCTION

The following is not an admission that anything discussed below is part of the prior art or part of the common general knowledge of a person skilled in the art.

Various constructions for surface cleaning apparatuses, such as vacuum cleaners, are known. Air may be drawn into the surface cleaning apparatus through a dirty air inlet and conveyed to an air treatment assembly, such as, for example, a cyclonic air treatment assembly. Within the air treatment assembly, some of the particulate matter (i.e., debris) captured within the airflow stream may be disentrained from the airflow stream. This disentrained debris may then be collected in a dirt collection region of the air treatment assembly. When the dirt collection region is full of debris, a user of the surface cleaning apparatus may empty the dirt collection region into, for example, a garbage bin.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In one aspect of this disclosure, a cyclone for a surface cleaning apparatus is provided. The cyclone has a cyclone chamber with an air inlet which may be a tangential air inlet. The air inlet has a downstream end that may be located in the cyclone chamber. The downstream end comprises an inlet air flow path comprising an inlet sidewall, an inlet end wall and an outlet port provided in the inlet sidewall, wherein one and, optionally, each of the inlet sidewall and the inlet end wall have inner surfaces that are curved.

An advantage of this aspect is that the curved inner surfaces of the inlet sidewall and the inlet end wall may limit the amount of turbulence produced as the air flow passes through the air inlet. Reducing the amount of turbulence may reduce back-pressure within the surface cleaning apparatus. Reducing the back-pressure may increase the suction power of the surface cleaning apparatus and/or improve battery performance.

In accordance with this aspect, there is provided a surface cleaning apparatus comprising a cyclone chamber, the cyclone chamber comprising an air inlet, an air outlet, a cyclone axis of rotation, first and second opposed ends and a cyclone chamber sidewall extending between the first and second end walls wherein the cyclone axis of rotation intersects the first and second ends, the air inlet has a downstream end that is located in the cyclone chamber, the downstream end comprises an inlet air flow path comprising an inlet sidewall, an inlet end wall and an outlet port provided in the inlet sidewall, wherein each of the inlet sidewall and the inlet end wall have inner surfaces that are curved.

In any embodiment, the air inlet may be a tangential air inlet that is located inside the cyclone chamber.

In any embodiment, the air inlet may be located at the first end of the cyclone chamber and the first end is openable.

In any embodiment, the first end may comprise an openable wall and, if the air inlet is provided at the first end, the air inlet may be moveable mounted with the openable wall.

In any embodiment, the downstream end of the air inlet may have a rear wall provided in the cyclone chamber, the rear wall may be opposed to and face the second end of the cyclone chamber and the rear wall may be planar.

The surface cleaning apparatus of claim 5 wherein rear wall extends in a plane that is generally transverse to the cyclone axis of rotation. Optionally, the rear wall may extend in a plane that extends downwardly and forwardly.

In any embodiment, the inlet end wall may have an outer side, the outer side may extend an axial distance through the cyclone chamber whereby a volume is provided between the cyclone chamber sidewall and the outer side and the volume is closed. Optionally, the volume is solid.

In any embodiment, the air inlet may extend adjacent the cyclone chamber sidewall.

In any embodiment, the air outlet may comprise\ a screen, the air outlet may be provided at the second end wall, the inlet end wall may be spaced from an axial inner end of the screen a first distance and the first distance may be at least equal to a radial width of the air inlet. Optionally, the first distance may be at least equal to a diameter of the air inlet. Alternately, or in addition, the air inlet may extend an axial distance into the cyclone chamber and the first distance is at least equal to the axial distance.

In any embodiment, if the air outlet comprises a screen, then the screen may be conical and extends at an angle of at least 45°, 60° or 75 from the cyclone axis of rotation.

In accordance with this aspect, there is Also provided a surface cleaning apparatus comprising an air treatment chamber, the air treatment chamber comprising an air inlet, an air outlet, first and second opposed ends, an air treatment chamber sidewall extending between the first and second ends and an axis that intersects the first and second opposed ends, the air inlet has a downstream end that is located in the air treatment chamber, the downstream end comprises an inlet air flow path comprising an inlet sidewall, an inlet end wall and an outlet port provided in the inlet sidewall, wherein the inlet end wall has an inner surface that is curved, the inlet end wall has an outer side, the outer side extends an axial distance through the air treatment chamber whereby a volume is provided between the air treatment chamber sidewall and the outer side and the volume is closed.

In any embodiment, the downstream end of the air inlet may have a rear wall provided in the air treatment chamber, the rear wall may be opposed to and face the second end of the air treatment chamber and the rear wall may be planar.

In any embodiment, the rear wall may extend in a plane that is generally transverse to the axis.

In any embodiment, the rear wall may extend in a plane that extends downwardly and forwardly.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
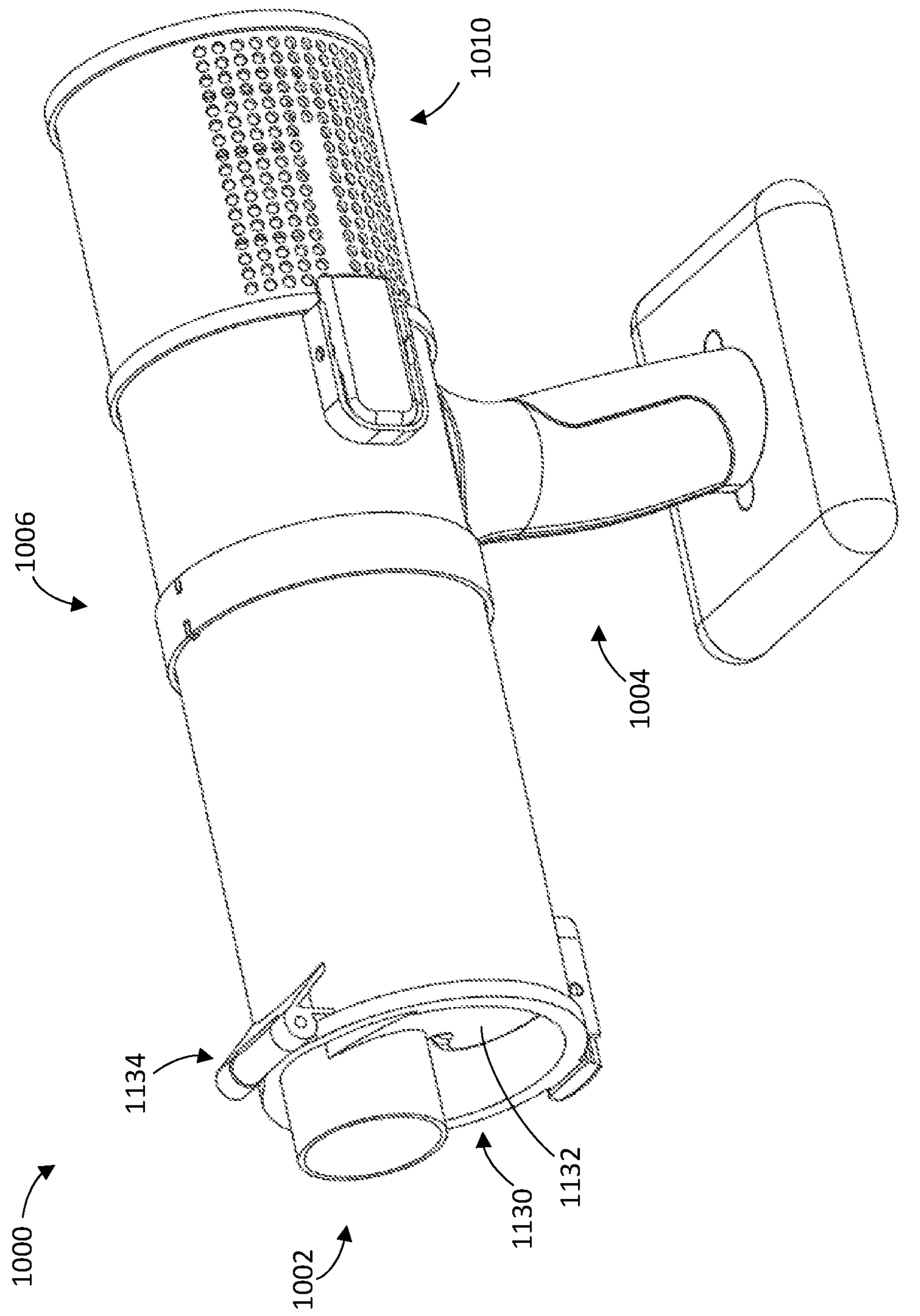
FIG. 1 is a perspective view of a surface cleaning apparatus.

The drawings included herewith are for illustrating various examples of articles, methods, and apparatuses of the teaching of the present specification and are not intended to limit the scope of what is taught in any way.

DESCRIPTION OF VARIOUS EMBODIMENTS

Various apparatuses will be described below to provide an example of an embodiment of each claimed invention. No embodiment described below limits any claimed invention and any claimed invention may cover apparatuses that differ from those described below. The claimed inventions are not limited to apparatuses having all of the features of any one apparatus described below or to features common to multiple or all of the apparatuses described below. It is possible that an apparatus described below is not an embodiment of any claimed invention. Any invention disclosed in an apparatus described below that is not claimed in this document may be the subject matter of another protective instrument, for example, a continuing patent application, and the applicants, inventors or owners do not intend to abandon, disclaim or dedicate to the public any such invention by its disclosure in this document.

The terms "an embodiment", "embodiment", "embodiments", "the embodiment", "the embodiments", "one or more embodiments", "some embodiments", and "one embodiment" mean "one or more (but not all) embodiments of the present invention(s)," unless expressly specified otherwise.

The terms "including", "comprising", and variations thereof mean "including but not limited to", unless expressly specified otherwise. A listing of items does not imply that any or all of the items are mutually exclusive, unless expressly specified otherwise. The terms "a", "an", and "the" mean "one or more", unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Some elements herein may be identified by a part number, which is composed of a base number followed by an alphabetical or subscript-numerical suffix (e.g., 112*a*, or $\mathbf{112}_1$). Multiple elements herein may be identified by part numbers that share a base number in common and that differ by their suffixes (e.g., $\mathbf{112}_1$, $\mathbf{112}_2$, and $\mathbf{112}_3$). All elements with a common base number may be referred to collectively or generically using the base number without a suffix (e.g., 112).

It should be noted that terms of degree such as "substantially", "about", and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

Referring to the Figures, an exemplary embodiment of a surface cleaning apparatus 1000 is shown. It is to be understood that each of the features described herein with respect to the exemplary embodiment may be used individually or in any particular combination or sub-combination in other embodiments.

In the illustrated embodiment, the surface cleaning apparatus 1000 is a hand vacuum cleaner, which may also be referred to also as a "handvac" or "hand-held vacuum cleaner". As used herein, a hand vacuum cleaner is a surface cleaning apparatus 1000 that can be operated to clean a surface generally one-handedly. That is, the entire weight of the hand vacuum cleaner may be held by the same one hand used to direct a dirty air inlet 1002 of the hand vacuum cleaner with respect to a surface to be cleaned. For example, a handle 1004 (a pistol grip handle in the example illustrated) and the dirty air inlet 1002 may be rigidly coupled to each other (directly or indirectly) so as to move as one while maintaining a constant orientation relative to each other. This is to be contrasted with, for example, canister and upright vacuum cleaners, whose weight is typically supported by a surface (e.g., a floor) during use.

While the illustrated embodiment shows an example of a hand vacuum cleaner, it is to be understood that any of the features described herein may relate to, and be used with non-hand vacuum cleaners, such as, for example, canister vacuum cleaners, upright vacuum cleaners, stick vacuum cleaners, all-in-head vacuum cleaners, carpet extractors, wet/dry vacuum cleaner, etc.

As exemplified in FIGS. 1 to 8, a surface cleaning apparatus 1000 may be a hand vacuum cleaner and may include a main body 1006, a handle 1004, an air treatment member 1008, a dirty air inlet 1002, a clean air outlet 1010, and an air flow path extending between the dirty air inlet 1002 and the clean air outlet 1010. The air treatment member 1008 is positioned at the front end of the main body 1006 and in the air flow path between the dirty air inlet 1002 and the clean air outlet 1010.

Figure 4:
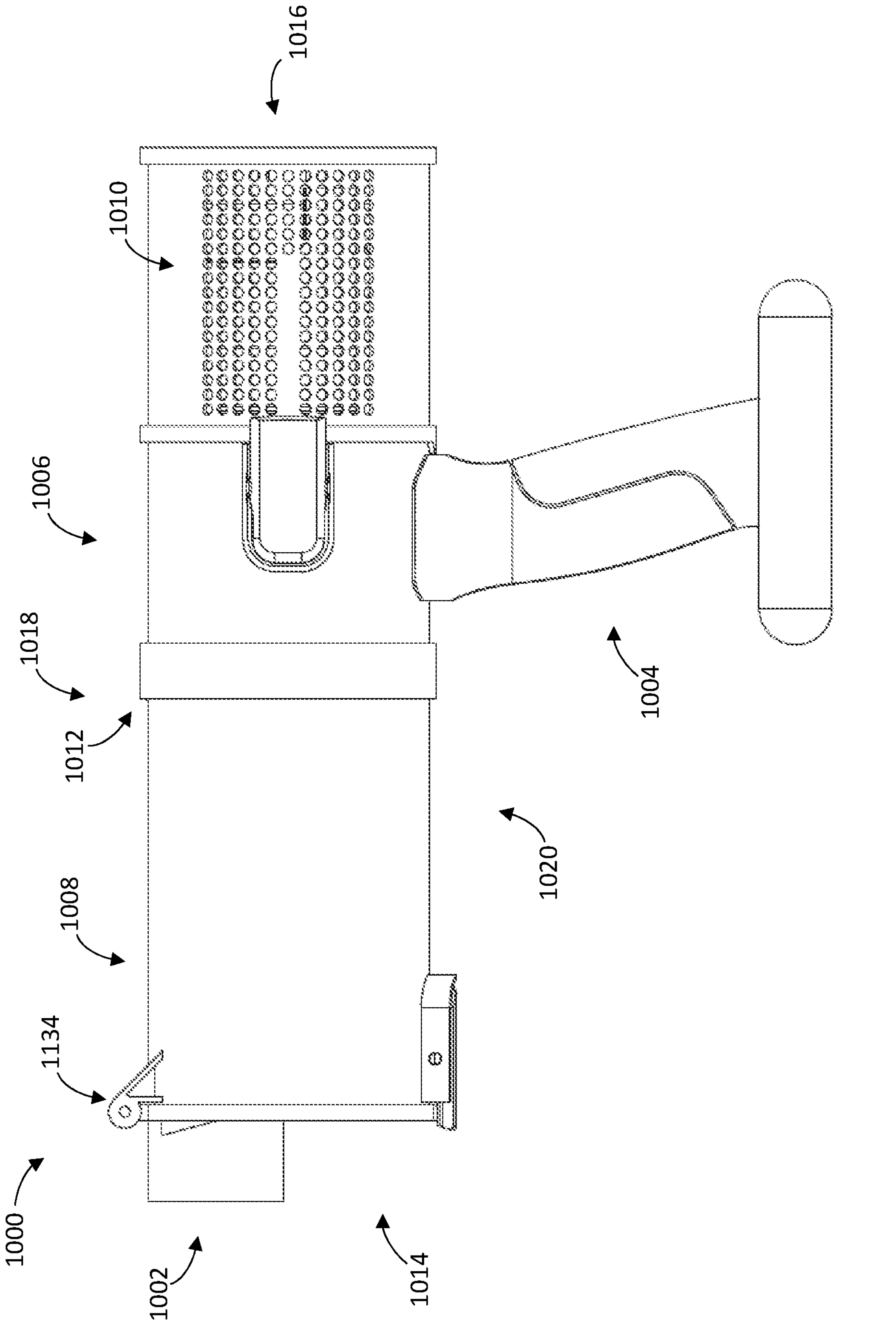
FIG. 4 is a side view of the surface cleaning apparatus of FIG. 1.

As shown in FIG. 4, the main body 1006 of the surface cleaning apparatus 1000 has a front end 1012, a rear end 1016, an upper end 1018 (i.e., top end), and a lower end 1020 (i.e., bottom end).

As exemplified in the embodiment shown in FIG. 4, the dirty air inlet 1002 may be at the upper end 1018 of the front end 1014 of the air treatment member 1008 and the clean air outlet 1010 may be positioned at the rear end 1016 of the main body 1006. In the example illustrated in FIG. 4, the dirty air inlet 1002 is positioned forward of the air treatment member 1008, although this need not be the case. It will be appreciated that the dirty air inlet 1002 and the clean air outlet 1010 may be provided in different locations.

It will be appreciated that the air treatment member 1008 may be provided at any location on the main body 1006 and may be removably mounted thereto or fixedly mounted in position on the main body 1006. Optionally, as exemplified, the air treatment member 1008 is removable mounted to the main body so as to permit a user to access an optional pre-motor filter 1140 when the air treatment member 1008 is removed from the main body 1006. It will be appreciated that the air treatment member 1008 may be removable as a closed unit other than an air treatment member air inlet and an air treatment member air outlet.

Optionally, as shown in FIG. 4, the dirty air inlet 1002 can be used as a nozzle to directly clean a surface. Alternatively, or in addition to functioning as a nozzle, the dirty air inlet 1002 may be connectable or directly connected to the downstream end of any suitable accessory tool such as, for example, a rigid air flow conduit (e.g., an above floor cleaning wand), a crevice tool, a mini brush, and the like.

Figure 5:
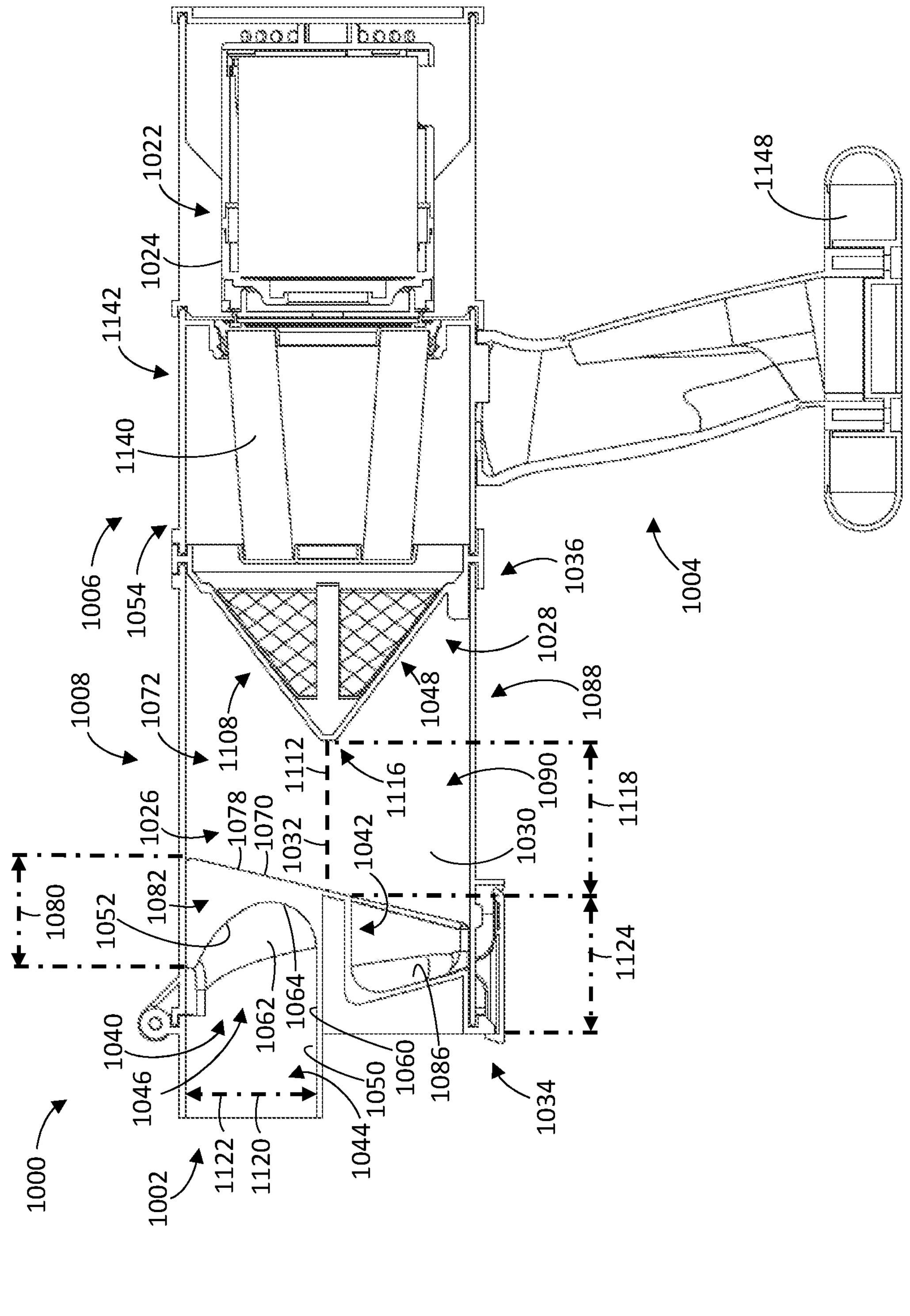
FIG. 5 is a cross-sectional view of the surface cleaning apparatus of FIG. 1, taken along line 5-5 in FIG. 3.
Figure 6:
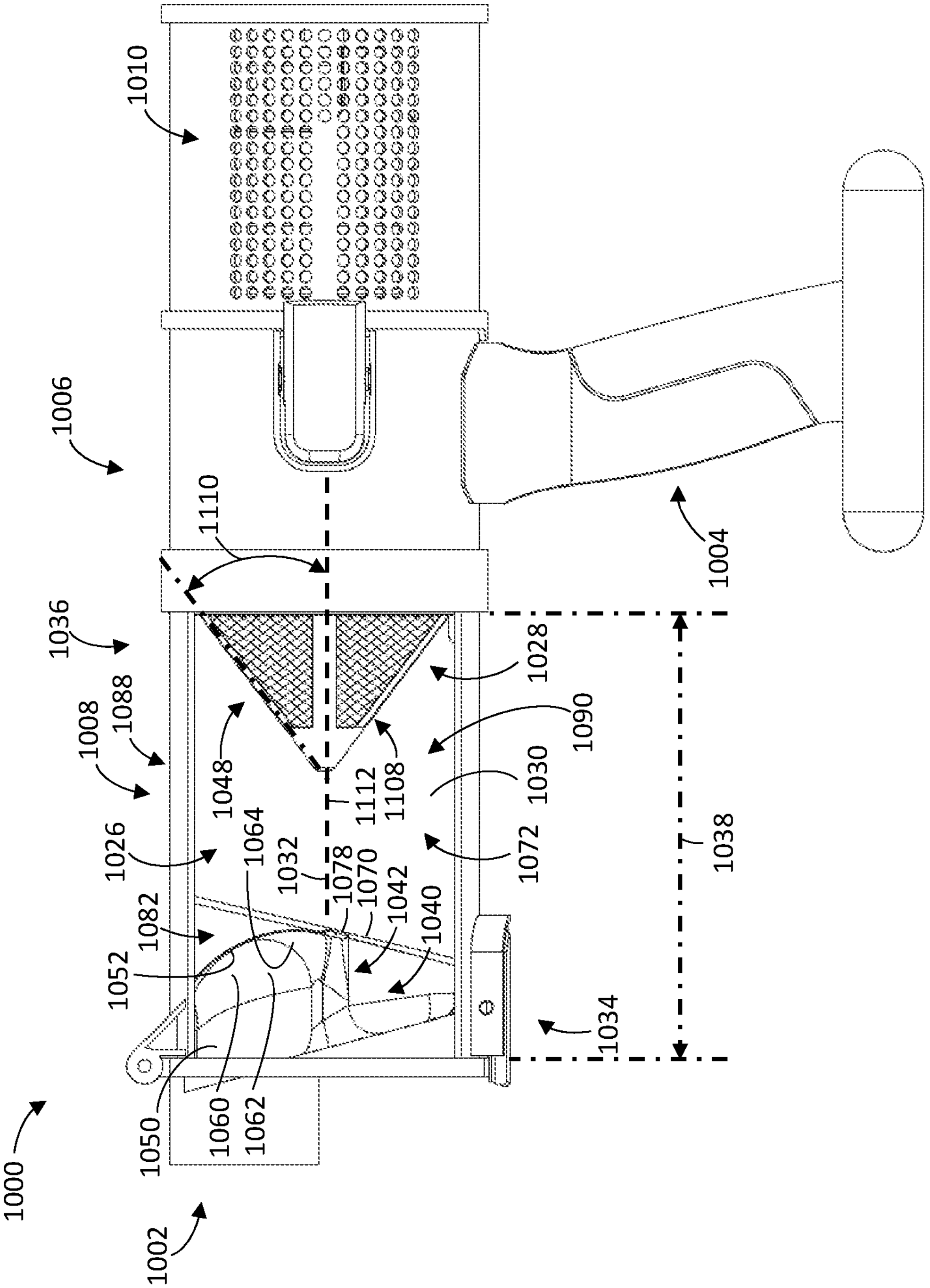
FIG. 6 is a side view of the surface cleaning apparatus of FIG. 1, shown with a portion of an air treatment chamber side wall removed.

Referring now to FIG. 5, a suction motor 1022 (i.e., motor and fan assembly) may be provided within the main body 1006 to generate vacuum suction through the air flow path and may be positioned within a motor housing 1024. In the example illustrated, the suction motor 1022 is positioned downstream from the air treatment member 1008, although it may be positioned upstream of the air treatment member 1008 (e.g., a dirty air motor) in alternative embodiments.

The air treatment member 1008 is configured to remove particles of dirt and other debris from the air flow and/or otherwise treat the air flow. Any air treatment member 1008 known in the art may be used. As exemplified, the air treatment member 1008 may include an air treatment chamber 1026 and a dirt collection chamber 1028 that is external to the air treatment chamber 1026. Alternately, separated dirt may be collected in the air treatment chamber 1026. Optionally, as exemplified, the air treatment chamber 1026 may be a cyclone chamber.

The air treatment chamber 1026 may be of any shape and size suitable for removing particles of dirt and other debris from the air flow as is passes therethrough. In the example illustrated in FIG. 5, the air treatment chamber 1026 includes an air treatment chamber sidewall 1030. The air treatment chamber sidewall 1030 may define a cross-sectional shape of the air treatment chamber 1026 in a plane transverse to a longitudinal axis 1032 of the air treatment chamber 1026, which may be a cyclone axis of rotation if the air treatment chamber 1026 is a cyclone chamber. As shown, the sidewall 1030 may extend between a first end 1034 and a second end 1036 of the air treatment chamber 1026. The distance 1038 between the first end 1034 and the second end 1036 of the air treatment chamber 1026 may define a length of the sidewall 1030.

Dirty air may enter the air treatment chamber 1026 via an air treatment chamber air inlet 1040. More specifically, dirty air may enter the air treatment chamber 1026 via an outlet port 1042 of the air treatment chamber air inlet 1040 (see, e.g., FIG. 7). As shown in FIG. 8, the air treatment chamber air inlet 1040 may guide the dirty air from the dirty air inlet 1002, through the outlet port 1042, and into the air treatment chamber 1026 of the air treatment member 1008. Referring now to FIG. 5, in the example illustrated, the air treatment chamber air inlet 1040 includes an upstream end 1044 in fluid flow communication with the dirty air inlet 1002 and a downstream end 1046. The downstream end 1046 has the outlet port 1042 at the downstream or air outlet end thereof. Air that has travelled through the air treatment chamber air inlet 1040 passes through the outlet port 1042 and then enters the air treatment chamber 1026.

The air treatment chamber air inlet 1040 may have any shape and size suitable for guiding the dirty air flow into the air treatment chamber 1026. As shown in FIG. 8, the air treatment chamber air inlet 1040 may be shaped to redirect (i.e., turn) the air flow from a first direction of air flow in the upstream end 1044 (in the example illustrated the first direction is generally parallel with the longitudinal axis 1032 of the air treatment chamber 1026) to a second direction of air flow as air flow through the downstream end 1046 (in the example illustrated, the second direction may be generally perpendicular to the longitudinal axis 1032 of the air treatment chamber 1026 and may provide a tangential flow of air into the air treatment chamber 1026).

It will be appreciated that if the air treatment chamber 1026 is a cyclone chamber, then the air treatment chamber air inlet 1040 optionally is a tangential air inlet to the cyclone chamber in which case the air exits the outlet port 1042 tangentially into the cyclone chamber.

As exemplified in FIG. 5, the downstream end 1046 of the air treatment chamber air inlet 1040 has an inlet sidewall 1050 for guiding the air flow. The inlet sidewall 1050 of the downstream end 1046 of the air treatment chamber air inlet 1040 terminates at an inlet end wall 1052. Accordingly, as shown in FIG. 8, the dirty air may flow generally parallel to the inlet sidewall 1050, impact the inlet end wall 1052, and then be redirected (e.g., turned downwardly in the example illustrated).

Figure 7:
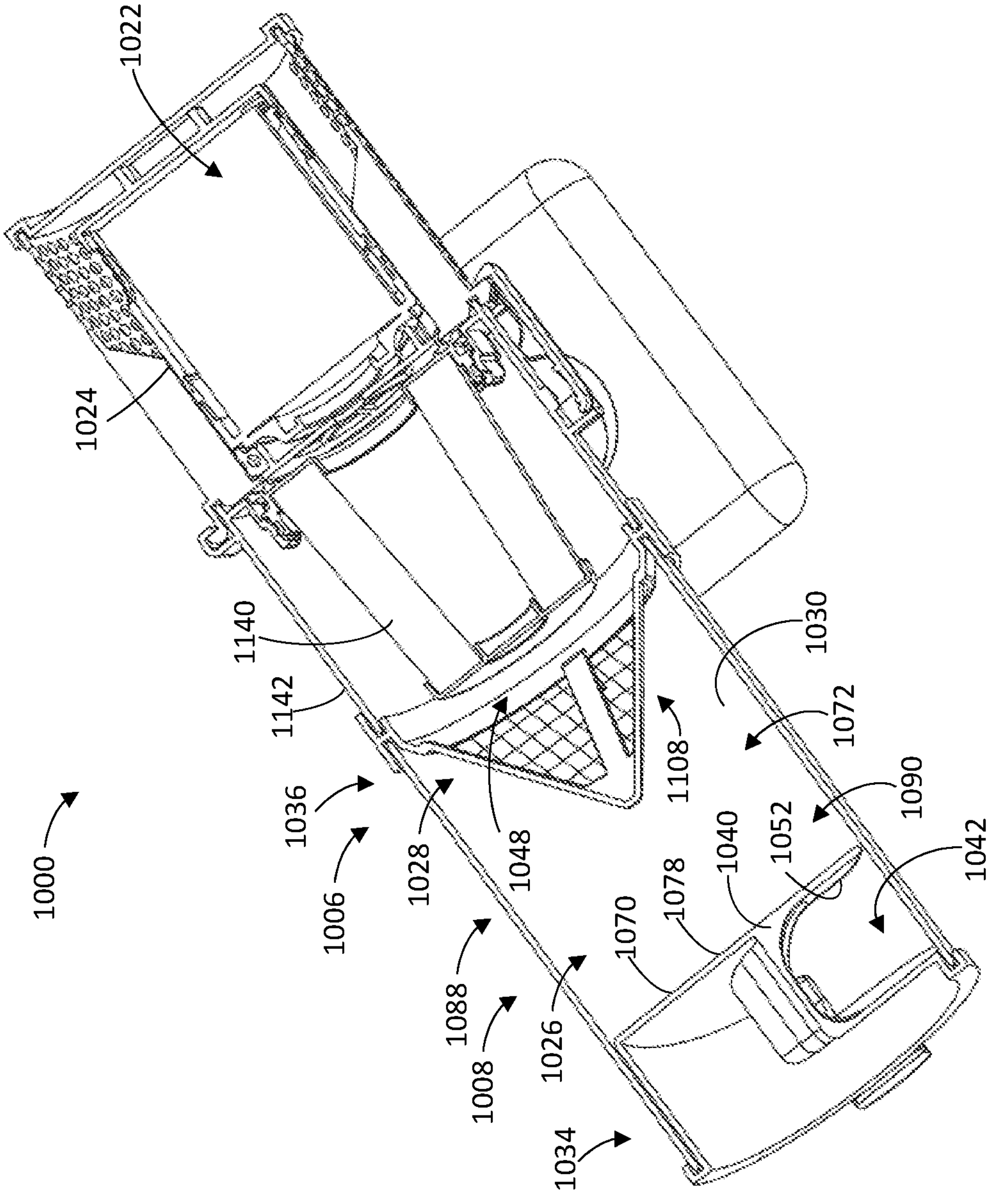
FIG. 7 is a cross-sectional view of the surface cleaning apparatus of FIG. 1, taken along line 7-7 in FIG. 3.
Figure 8:
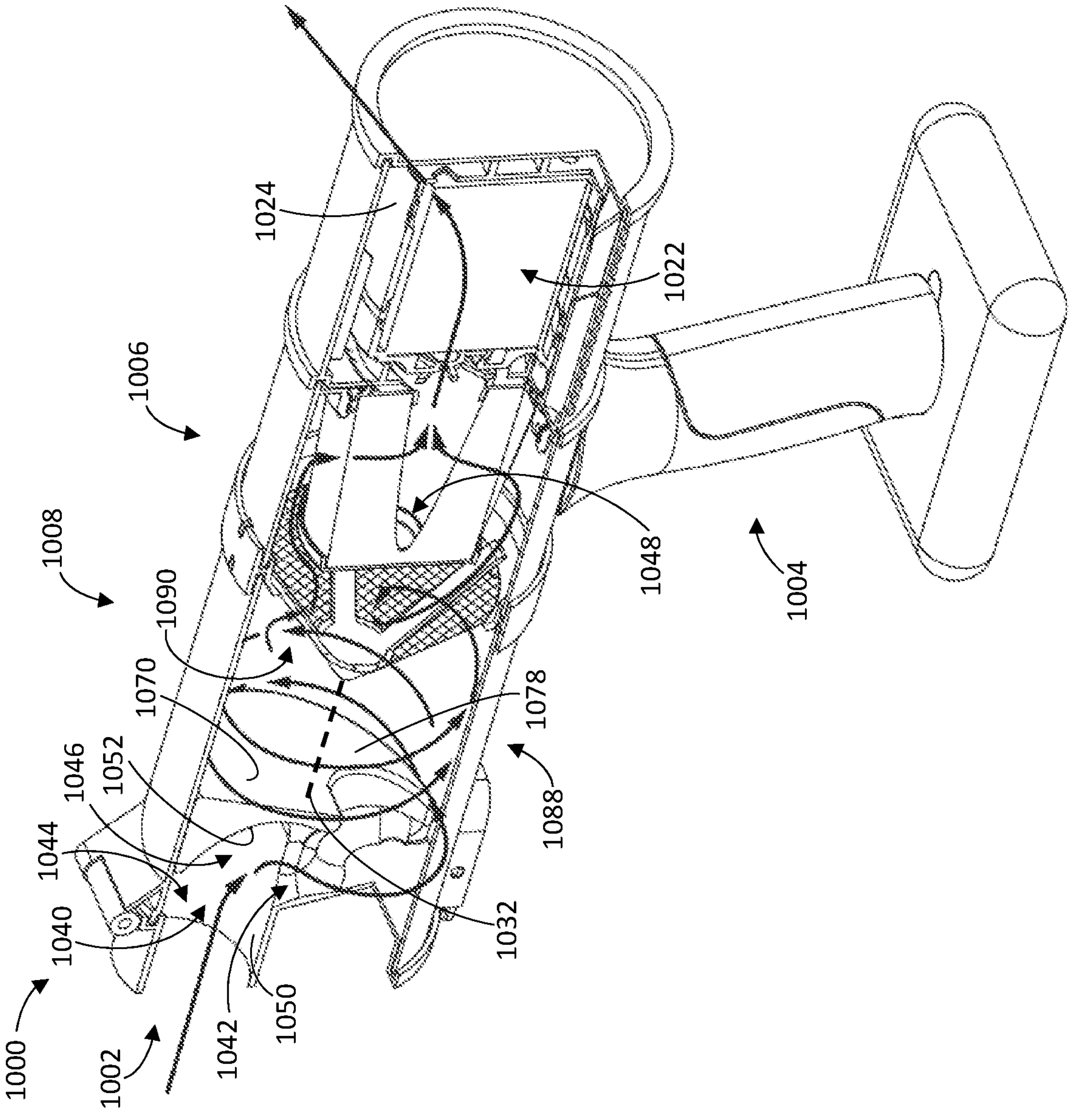
FIG. 8 is perspective view of the surface cleaning apparatus as shown in FIG. 5, shown with an air flow path extending from a dirty air inlet to a clean air outlet.
Figure 9:
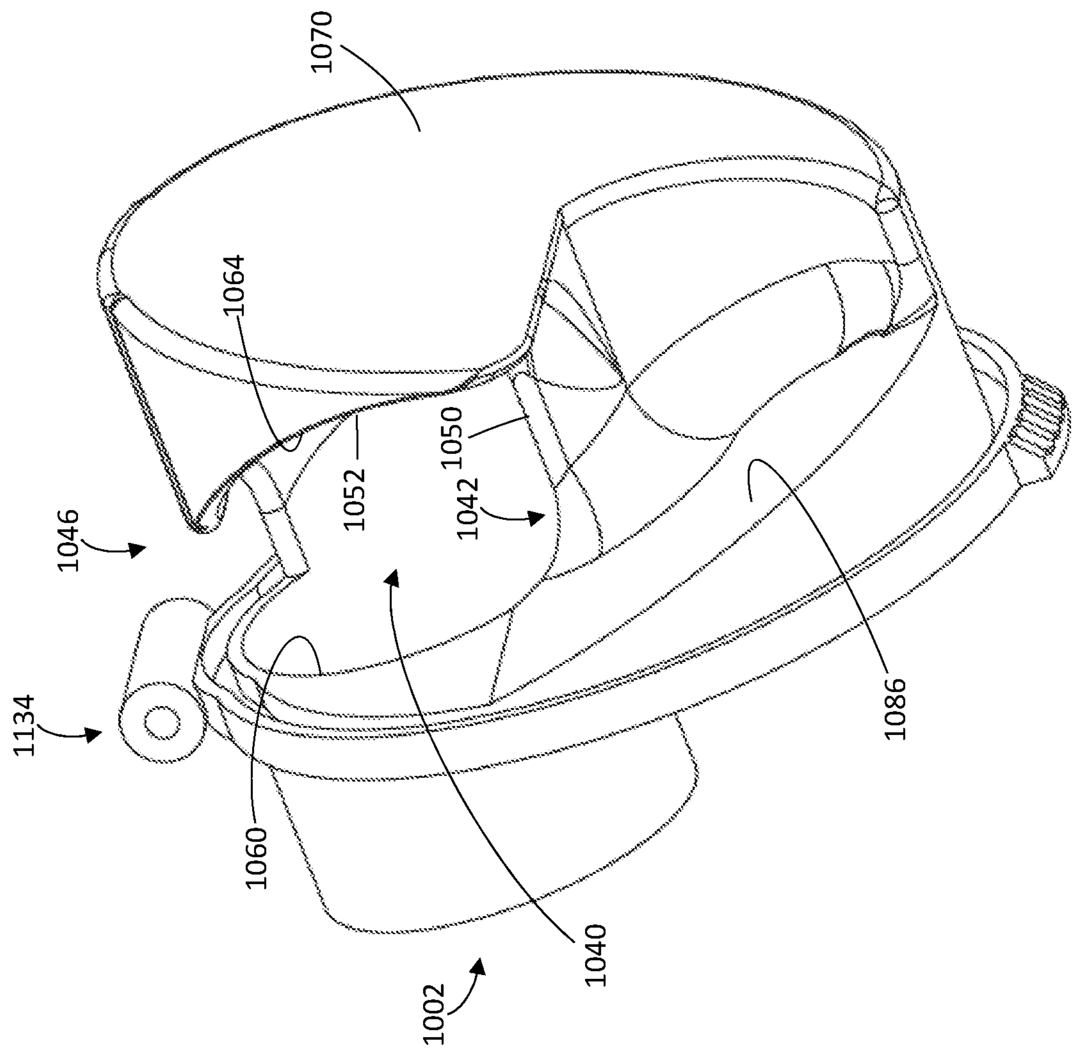
FIG. 9 is a perspective view from the side and rear of the first end of the cyclone chamber of the surface cleaning apparatus of FIG. 1.

As exemplified in FIGS. 7 and 9, the air treatment chamber air inlet 1040 may be provided in the air treatment chamber 1026. In such as case, the outlet port 1042 fluidically connecting the air treatment chamber air inlet 1040 and the air treatment chamber 1026 may be in the inlet sidewall 1050 of the air treatment chamber air inlet 1040, optionally proximate the inlet end wall 1052 of the air treatment chamber air inlet 1040. Accordingly, as shown in FIG. 8, the dirty air may impact the inlet end wall 1052, turn (e.g., turn downwardly in the example shown), and exit the downstream end 1046 of the air treatment chamber air inlet 1040 via the outlet port 1042.

As exemplified in FIGS. 7 and 9, the air treatment chamber air inlet 1040 may be provided in the air treatment chamber 1026. In such as case, the outlet port 1042 fluidically connecting the air treatment chamber air inlet 1040 and the air treatment chamber 1026 may be in the sidewall of the air treatment chamber.

In accordance with an aspect of this disclosure, the air treatment chamber air inlet 1040 comprises a curved section to assist in directing the air flow from a generally axial flow in the upstream end 1044 to the generally perpendicular flow section of the downstream end 1046. The curved section may assist in having larger or longer rigid pieces of dirt travel through the air inlet 1040 to the air treatment chamber 1026.

As exemplified in FIGS. 5 to 8, an inner surface 1060 of some or all of the portion of inlet sidewall 1050 of the downstream end 1046 of the air treatment chamber air inlet 1040 at the inlet end wall 1052 may be curved. Accordingly, with reference to FIG. 6, some or all of the inner surface 1060 of the inlet sidewall 1050 may be curved at the location at which the inlet sidewall 1050 meets the inlet end wall 1052 (see, e.g., zone 1062 in FIG. 6). For example, the portion immediately upstream of the inlet end wall 1052 may be curved or all of the inlet sidewall 1050 may be curved. The degree of curvature may vary along the length of the inlet sidewall 1050, or it may have a constant degree of curvature.

Alternatively, or in addition to some or all of the inner surface 1060 of the inlet sidewall 1050 being curved, as exemplified in FIGS. 5 to 8, some or all of the inner surface 1064 of the inlet end wall 1052 may be curved. Accordingly, as exemplified in FIG. 8, the inlet end wall 1052 may be curved so that air may be urged toward the outlet port 1042 (e.g., the inner surface 1064 of the inlet end wall 1052 may be arched with the concave portion generally facing the outlet port 1042). The degree of curvature may vary along the length of the inlet end wall 1052, or it may have a constant degree of curvature.

It will be appreciated that the curved portion of the inlet sidewall 1050 and the inlet end wall 1052 may define a continuous curved surface. Accordingly, the air may follow a continuously curved surface as the air transitions from an axial flow to a tangential flow.

Referring now to FIG. 5, the downstream end 1046 of the air treatment chamber air inlet 1040 may have a rear wall 1070 provided in the air treatment chamber 1026. As shown, the rear wall 1070 may be opposed to and face the second end 1036 of the air treatment chamber 1026. Accordingly, the rear wall 1070 of the air treatment chamber air inlet 1040 and the second end 1036 of the air treatment chamber 1026 may define an air treatment region 1072 of the air treatment chamber 1026 in which dirt and/or debris may be disentrained from the air flow as it passes therethrough. Optionally, as shown in the example illustrated in FIG. 5, the air treatment region 1072 may include the dirt collection chamber 1028 (i.e., internal dirt collection chamber 1028) in which disentrained dirt and/or debris may collect.

As shown in FIG. 5, the rear wall 1070 of the air treatment chamber air inlet 1040 may be planer. It may be desirable for the rear wall 1070 to be planer to limit the number of tight spaces and corners in which dirt may compact and become stuck within the air treatment chamber 1026.

Optionally, as exemplified in FIG. 5, the rear wall 1070 extends in a plane that extends downwardly and forwardly. However, it will be appreciated that in other examples, the rear wall 1070 may extend in a plane that is generally transverse to the cyclone axis of rotation, upwardly and rearwardly, etc.

Still referring to FIG. 5, it will be appreciated that the rear wall 1070 (i.e., an outer side 1078 of the inlet end wall 1052 of the air treatment chamber air inlet 1040) may be positioned a distance 1080 axially inwardly into the air treatment chamber 1026 from the inner surface 1064 of the inlet end wall 1052. Accordingly, as shown, a volume 1082 may be provided between the inner surface 1064 of the inlet end wall 1052 and the outer side 1078 of the inlet end wall 1052.

Optionally, as shown, the volume 1082 may be closed. That is, the volume 1082 may not be in fluid communication with the air treatment chamber 1026. It may be desirable to close the volume 1082 to limit the number of tight spaces and corners in which dirt and/or debris may compact and become stuck. Optionally, the volume 1082 may be solid.

As exemplified in FIG. 5, if the air treatment chamber air inlet 1040 is positioned in the air treatment chamber, then of the air treatment chamber sidewall 1030 may enclose (surround) some or all of the of the air treatment chamber air inlet 1040. Accordingly, the air treatment chamber air inlet 1040 may be positioned in the air treatment chamber 1026 and the air treatment chamber air inlet 1040 may be adjacent the air treatment chamber sidewall 1030. When positioned in the air treatment chamber 1026, as shown, the air treatment chamber air inlet 1040 may be located at the first end 1034 of the air treatment chamber 1026.

As exemplified in FIG. 9, the air treatment chamber air inlet 1040 may include a projection 1086 downstream of the outlet port 1042 for directing the air flow toward the second end 1036 of the air treatment chamber 1026 (see also FIG. 5). Accordingly, after the air flow passes through the outlet port 1042, the air flow may impact the projection 1086 and be directed towards the second end 1036 of the air treatment chamber 1026. Therefore, as shown in FIG. 8, the air flow may be urged to travel in a helical or cyclonic manner within the air treatment chamber 1026 from outlet port 1042 toward the second end 1036 of the air treatment chamber 1026.

Referring now to FIG. 5, in the example illustrated, the air treatment member 1008 is a cyclone assembly 1088 having a single cyclone chamber 1090 and a dirt collection chamber 1028 internal to the cyclone chamber 1090 (i.e., a single cyclonic cleaning stage). The cyclone chamber 1090 and dirt collection chamber 1028 may be of any configuration suitable for separating debris from an air flow and collecting the separated dirt and/or debris, respectively. In the example shown in FIG. 5, the cyclone chamber 1090 is a uniflow cyclone (i.e., a cyclone chamber 1090 with a unidirectional flow of air). As exemplified, a uniflow cyclone may have an air treatment chamber air inlet 1040 (i.e., a cyclone air inlet) at a first end 1034 (front end in the example illustrated) of the cyclone chamber 1090 and an air treatment chamber air outlet 1048 (i.e., a cyclone chamber air outlet) a second end 1036 (rear end in the example illustrated) of the cyclone chamber 1090. In the example illustrated, the cyclone chamber air inlet is a tangential air inlet.

In other examples, the cyclone chamber 1090 may not be a uniflow cyclone, and the air treatment chamber air inlet 1040 (i.e., cyclone chamber air inlet) and the air treatment chamber air outlet 1048 (i.e., cyclone chamber air outlet) may be provided at the same end of the cyclone chamber 1090.

While the example illustrates a cyclone chamber 1090 having a dirt collection chamber 1028 internal to the cyclone chamber 1090, it is to be understood that the dirt collection chamber 1028 may be external to the cyclone chamber 1090.

As shown in FIG. 5, the air treatment chamber air outlet 1048 of the air treatment chamber 1026 may comprise a screen 1108. The screen 1108 may be of any shape and size suitable for reducing the likeliness of dirt and/or debris from exiting the air treatment chamber 1026 via the air treatment chamber air outlet 1048. In the example shown, the screen 1108 is conical in shape. The included angle 1110 between the longitudinal axis 1032 of the air treatment chamber 1026 (i.e., a cyclone chamber axis of rotation 1112 when the air treatment member 1008 is configured as a cyclone assembly 1088) and the outer conical wall of the screen 1108 (see, e.g., FIG. 6) may vary. The angle 1110 may be at least 45°, optionally at least 60°, optionally at least 75° from the cyclone axis of rotation 1112.

The air treatment chamber 1026 may be oriented in any direction. For example, when the surface cleaning apparatus 1000 is oriented with the upper end 1018 above the lower end 1020, e.g., positioned generally parallel to a horizontal surface, a central axis, or cyclone axis of rotation 1112, or longitudinal axis 1032 of the air treatment chamber 1026 may be oriented horizontally, as exemplified in FIG. 5. In alternative embodiments, the air treatment chamber 1026 may be oriented vertically, or at any angle between horizontal and vertical.

In alternative embodiments, when the air treatment member 1008 is configured as a cyclone assembly 1088, the cyclone assembly 1088 may include two or more cyclonic cleaning stages arranged in series with each other. Each cyclonic cleaning stage may include one or more cyclone chambers 1090 (arranged in parallel or series with each other) and one or more dirt collection chambers 1028 of any suitable configuration. The dirt collection chamber(s) 1028 may be external to the cyclone chamber(s) 1090 or may be internal the cyclone chamber(s) 1090 (i.e., configured as a dirt collection area or region within the cyclone chamber(s)) 1090. It will be appreciated that an air treatment member 1008 may have two or more stages, each of which may use one or more air treatment chambers 1026.

It is to be understood that the air treatment chamber 1026 of the air treatment member 1008 may not be a cyclonic cleaning stage. Such a non-cyclonic stage may be a non-cyclonic air treatment chamber (a non-cyclonic momentum separator) and/or it may incorporate a bag, a porous physical filter media (such as foam or felt), or other air treating means. A combination of non-cyclonic and cyclonic treatment members may be used.

Optionally, as exemplified in FIG. 5, the inlet end wall 1052 to be spaced from an axial inner end 1116 of the screen 1108 a first distance 1118 that is at least equal to a radial width 1120 of the air treatment chamber air inlet 1040. For example, if the air treatment chamber air inlet 1040 is cylindrical, then the first distance 1118 may be at least equal to a diameter 1122 of the air treatment chamber air inlet 1040.

It will be appreciated that the first distance 1118 may be measured from the outer side 1078 of the inlet end wall 1052, as is exemplified in FIG. 5. Further, if the outer side 1078 of the inlet end wall 1052 extends at an angle, then the first distance 1118 may be measured from the portion of the outer side 1078 of the inlet end wall 1052 that is closest to the portion of the screen 1108 that is located closest to the outer side 1078 of the inlet end wall 1052 (e.g., the apex of the cone of the screen 1108).

Alternately, or in addition, as exemplified in FIG. 5, the air treatment chamber air inlet 1040 may extend an axial distance 1124 into the air treatment chamber 1026, wherein the first distance 1118 may be at least equal to the axial distance 1124.

Accordingly, the first distance 1118 may be (a) at least equal to the radial width 1120 of the air treatment chamber air inlet 1040; and/or (b) at least equal to the axial distance 1124. However, it will be appreciated that these distances may vary. For example, the first distance 1118 may be less than the radial width 1120 of the air treatment chamber air inlet 1040 and/or the axial distance 1124. Such a design may result in a surface cleaning apparatus 1000 having a reduced length in the axial (front to back) direction.

Figure 2:
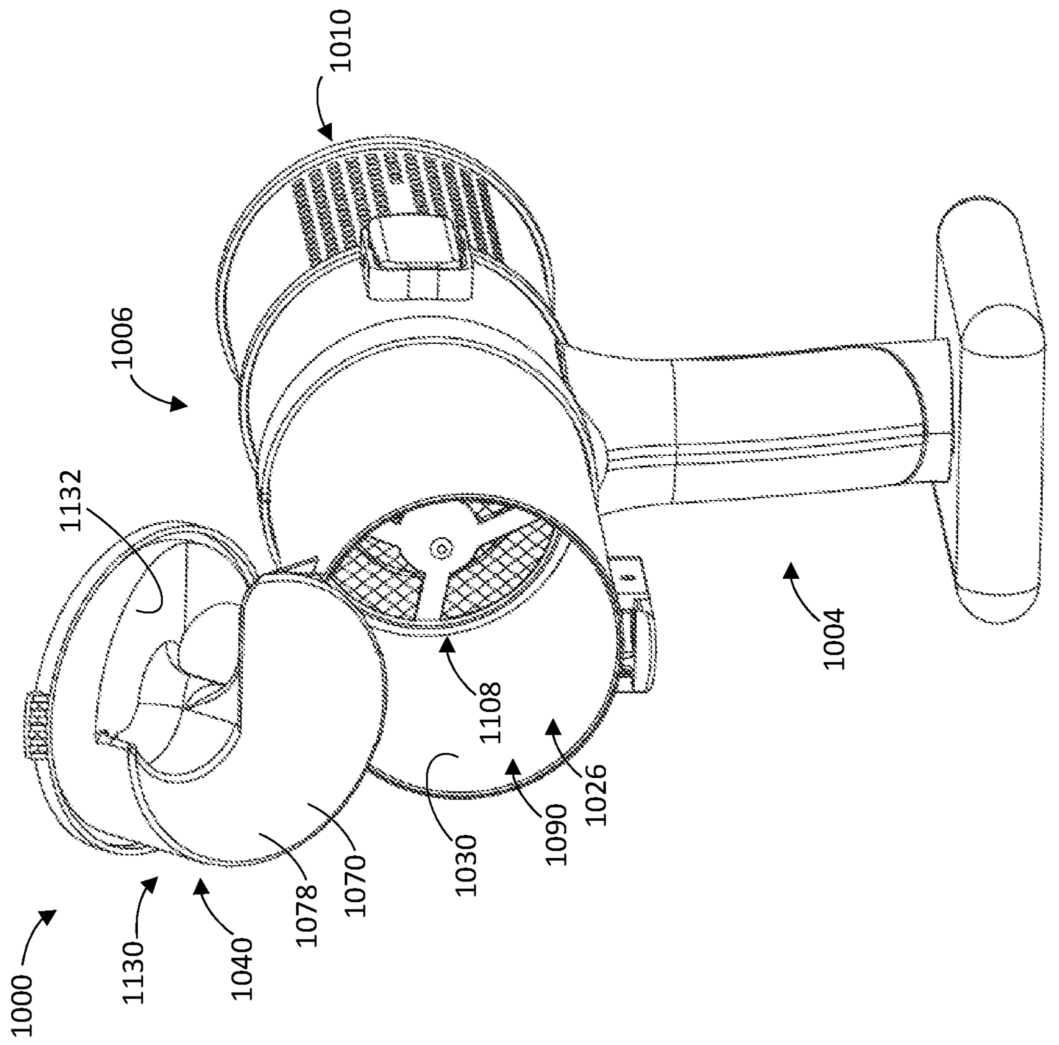
FIG. 2 is a perspective view of the surface cleaning apparatus of FIG. 1, shown with a first end of an air treatment chamber of the surface cleaning apparatus in an open position.
Figure 3:
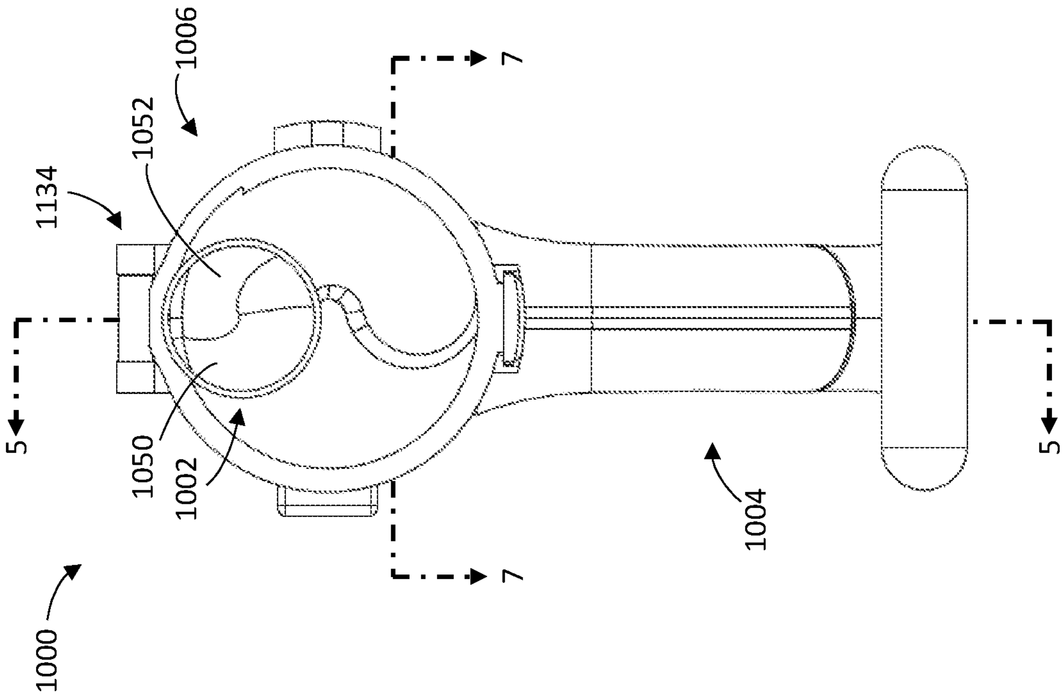
FIG. 3 is a front view of the surface cleaning apparatus of FIG. 1, wherein the front wall is transparent.

As exemplified in FIGS. 1 and 2, the air treatment member 1008 may include an openable portion 1130 that is moveable between an open position (see FIG. 2) and a closed position (see FIG. 1). The openable portion 1130 may, when in the open position, facilitate discharge of debris separated from the air flow by the air treatment member 1008 therefrom. In the example illustrated, the openable portion 1130 is at the first end 1034 of the air treatment chamber 1026, and comprises, consists essentially of or consists of the front wall of the air treatment chamber 1026. However it will be appreciated that the openable portion 1130 may be otherwise located, for example, in the sidewall 1030. It will be appreciated that only a portion of the front wall may be openable. For example, when the surface cleaning apparatus 100 is oriented as shown in FIG. 2 with the handle extending downwardly from the main body, only the lower portion of the front wall may be openable. In such a case, for example, the upper portion of the sidewall, which includes the air inlet 1040, may remain fixed in position when the lower portion of the front wall opens, e.g., pivots open forwardly.

In the example illustrated in FIG. 2, the first end 1034 of the air treatment chamber 1026 is an openable wall 1132 and the air treatment chamber air inlet 1040 is mounted to be moveable with the openable wall 1132. It will be appreciated that in other examples, a portion of the first end 1034 of the air treatment chamber 1026 may be openable to discharge debris from the air treatment chamber 1026 with or without moving the air treatment chamber air inlet 1040.

In the example shown, a hinge 1134 pivotally connects the openable wall 1132 including the air treatment chamber air inlet 1040, to the upper end 1018 of the air treatment chamber sidewall 1030. It may be desirable to position the hinge 1134 at the upper end 1018 to reduce the likeliness of a user's hands becoming dirty when emptying the dirt collection chamber 1028. However, it will be appreciated that the 1134 hinge may be otherwise positioned. It will be appreciated that, in other embodiments, the openable wall 1132 may be otherwise moveably mounted or may be removably mounted.

As discussed above, in alternative embodiments (not shown), the dirt collection chamber 1028 may be positioned external to the air treatment chamber 1026. Accordingly, the air treatment chamber 1026 may not be openable to discharge debris therefrom, or it may be separately or concurrently opened.

It will be appreciated that air inlet 1040 may extend in the radial direction around the cyclone axis of rotation 1112. As exemplified in FIG. 2, the air inlet 1040 extends about 180° around the cyclone axis of rotation 1112 and the air may exit the air inlet 1040 tangentially. Alternately, it will be appreciated that the air inlet 1040 may extend more or less than 180° around the cyclone axis of rotation 1112. For example, the air inlet 1040 may extend about 90° around the cyclone axis of rotation 1112. Such an embodiment may be used, for example, if only a portion of the front wall opens, in which case, the air inlet 1040 may be provided on the portion of the front wall that does not open.

As exemplified in FIG. 5, the surface cleaning apparatus 1000 may include a pre-motor filter 1140. The pre-motor filter 1140 may be provided in a pre-motor filter housing 1142 provided in the air flow path downstream of the air treatment member 1008 and upstream of the suction motor 1022. The pre-motor filter 1140 and the pre-motor filter housing 1142 may be of any suitable construction known in the art. The pre-motor filter 1140 may be formed from any suitable physical, porous filter media and have any suitable shape. For example, the pre-motor filter 1140 may be one or more of a foam filter, felt filter, HEPA filter, other physical filter media, electrostatic filter, and the like.

Optionally, the pre-motor filter housing 1142 may be openable to provide access to the interior of the pre-motor filter housing 1142. For example, the pre-motor filter housing 1142 may be opened when the air treatment chamber 1026 is removed from the main body. The pre-motor filter housing 1142 may be removable from the main body with the air treatment member or it may remain behind when the air treatment chamber 1026 is removed.

The hand vacuum cleaner may also include a post-motor filter (not shown) provided in the air flow path downstream of the suction motor 1022 and upstream of the clean air outlet 1010. The post-motor filter may be formed from any suitable physical, porous filter media and having any suitable shape. The post-motor filter may be any suitable type of filter such as one or more of a foam filter, felt filter, HEPA filter, other physical filter media, electrostatic filter, and the like.

As exemplified in FIG. 5, power may be supplied to the suction motor 1022 and other electrical components of the hand vacuum cleaner from an onboard energy storage member 1148 which may include, for example, one or more batteries, capacitors or other energy storage devices. In the example illustrated, the onboard energy storage member 1148 is positioned in the handle 1004. It will be appreciated that the onboard energy storage member 1148 may be otherwise located. In alternative embodiments, in addition to the energy storage member 1148 or instead of the energy storage member 1148, power may be supplied to the surface cleaning apparatus 1000 by an electrical cord connected to the surface cleaning apparatus 1000 (not shown) and that can be connected to a standard wall electrical outlet.

A power switch (not shown) may be provided to selectively control the operation of the suction motor 1022 (e.g., either on/off or variable power levels or both), for example by establishing a power connection between the energy storage member 1148 and the suction motor 1022. The power switch may be provided in any suitable configuration and location, including a button, rotary switch, sliding switch, trigger-type actuator and the like. The power switch or an alternate controller may also be configured to control other aspects of the surface cleaning apparatus 1000 (brush motor on/off, etc.).

Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A surface cleaning apparatus comprising an air treatment chamber, the air treatment chamber comprising an air inlet, an air outlet, first and second opposed ends, a treatment chamber axis extending between the first and second opposed ends and an air treatment chamber sidewall extending between the first and second ends, the air inlet comprising:

an inlet conduit that is located in the air treatment chamber, the inlet conduit comprising an inlet port, an inlet sidewall extending inwardly into the air treatment chamber along an inlet axis from the inlet port, an inlet end wall axially opposed to the inlet port, a transition curve between the inlet sidewall and the inlet end wall, and an outlet port provided in the inlet sidewall and facing towards a portion of the air treatment chamber sidewall, the inlet end wall forming an axial inward end of the outlet port, the inlet axis extending centrally through the inlet conduit in a common direction with the treatment chamber axis between the inlet port and the inlet end wall, wherein the inlet sidewall has an inner surface, the inlet end wall has an inner surface, and the transition curve has a curved inner surface that transitions from the inner surface of the inlet sidewall to the inner surface of the inlet end wall, the inner surfaces of the inlet sidewall, the inlet end wall, and the transition curve defining an air flow passage through the inlet conduit from the inlet port to the outlet port whereby, in use, air travels within the inlet conduit in a general direction of the inlet axis from the inlet port to the transition curve and the transition curve and the inlet end wall redirect the air to flow through the outlet port, and wherein air exits the air outlet of the air treatment chamber in a flow direction, the flow direction extending in the common direction.

2. The surface cleaning apparatus of claim 1 wherein the air inlet is a tangential air inlet that is located inside the air treatment chamber and the air treatment chamber is a cyclone chamber.

3. The surface cleaning apparatus of claim 1 wherein the first end of the air treatment chamber is openable.

4. The surface cleaning apparatus of claim 3 wherein the first end comprises an openable wall and the air inlet is moveable mounted with the openable wall.

5. The surface cleaning apparatus of claim 1 wherein the air inlet has a rear wall provided in the air treatment chamber, the rear wall is opposed to and faces the second end of the air treatment chamber and the rear wall is planar.

6. The surface cleaning apparatus of claim 5 wherein the rear wall extends in a plane that is generally transverse to the treatment chamber axis.

7. The surface cleaning apparatus of claim 5 wherein the rear wall extends in a plane that extends downwardly and forwardly.

8. The surface cleaning apparatus of claim 1 wherein the air outlet comprises a screen, the air outlet is provided at the second end, the inlet end wall is spaced from an axial inner end of the screen a first distance and the first distance is at least equal to a radial width of the air inlet.

9. The surface cleaning apparatus of claim 8 wherein the air inlet extends an axial distance into the air treatment chamber and the first distance is at least equal to the axial distance.

10. The surface cleaning apparatus of claim 8 wherein the screen is conical and extends at an angle of at least 45° from the axis.

11. The surface cleaning apparatus of claim 10 wherein the angle is at least 60° from the axis.

12. The surface cleaning apparatus of claim 10 wherein the angle is at least 75° from the axis.

13. The surface cleaning apparatus of claim 1 wherein the inner surface of the inlet sidewall that is curved and the inner surface of the inlet end wall that is curved define a continuous curve.

14. A surface cleaning apparatus comprising an air treatment chamber, the air treatment chamber comprising an air inlet, an air outlet, first and second opposed ends, a treatment chamber axis extending between the first and second opposed ends and an air treatment chamber sidewall extending between the first and second ends, wherein the air inlet has a downstream end that is located in the air treatment chamber, the downstream end comprises an inlet air flow path comprising an inlet sidewall, an inlet end wall and an outlet port, the inlet end wall forming an axial inward end of the outlet port, the inlet sidewall and the inlet end wall having inner surfaces along which air flows as the air travels to and through the outlet port, and an inlet axis extends in a common direction with the treatment chamber axis centrally through an empty volume defined by the inner surface of the inlet sidewall, wherein the inner surface of the inlet sidewall is curved at a location at which the inlet sidewall meets the inlet end wall and the inlet end wall also has an inner surface that is curved, wherein the outlet port faces towards a portion of the air treatment chamber sidewall whereby the downstream end of the air inlet redirects air traveling through an upstream portion of the air inlet from a generally axial flow to flow through the outlet port, wherein the inlet end wall has an outer side that is axially opposed to the inner surface of the end wall, the outer side is spaced axially inwardly into the air treatment chamber from the inner surface of the end wall such that the inlet axis intersects the inner surface and the outer side of the inlet end wall whereby a volume is provided between the air treatment chamber sidewall, the inner surface of the end wall, and the outer side, and the volume is closed from fluid communication with the air treatment chamber, and wherein air exits the air outlet of the air treatment chamber in a flow direction, the flow direction extending in a common direction with the axis.

15. The surface cleaning apparatus of claim 14 wherein the volume is solid.

16. A surface cleaning apparatus comprising an air treatment chamber, the air treatment chamber comprising an air inlet, an air outlet, first and second opposed ends, an air treatment chamber sidewall extending between the first and second ends and a treatment chamber axis that intersects the first and second opposed ends, the air inlet has a downstream end that is located in the air treatment chamber, the downstream end comprises an inlet air flow path comprising an inlet sidewall, an inlet end wall, which is located at an axially inner end of the inlet sidewall, and an outlet port that faces towards a portion of the air treatment chamber sidewall, the inlet end wall forming an axial inward end of the outlet port, the inlet sidewall and the inlet end wall having inner surfaces along which air flows as the air travels to and through the outlet port, the downstream end having an inlet axis extending centrally through an empty volume defined by the inner surface of the inlet sidewall in a common direction with the treatment chamber axis, the inner surfaces comprising a curved portion that is located at the outlet port of the air flow path, wherein the inlet axis intersects the inlet end wall, the inlet end wall has an outer side that is axially opposed to the inner surface of the end wall, the outer side is spaced axially inwardly into the air treatment chamber from the inner surface of the end wall in the common direction whereby a volume is provided between the air treatment chamber sidewall, the inner surface of the end wall and the outer side, and the volume is closed and separate from the air treatment chamber, and wherein air exits the air outlet of the air treatment chamber in a flow direction, the flow direction extending in the common direction.

17. The surface cleaning apparatus of claim 16 wherein the downstream end of the air inlet has a rear wall provided in the air treatment chamber, the rear wall is opposed to and faces the second end of the air treatment chamber and the rear wall is planar.

18. The surface cleaning apparatus of claim 17 wherein the rear wall extends in a plane that is generally transverse to the axis.

19. The surface cleaning apparatus of claim 17 wherein the rear wall extends in a plane that extends downwardly and forwardly.

* * * * *